Sept. 11, 1934.  E. M. LECKBAND  1,973,572
BOX COVER FASTENER
Filed Oct. 5, 1933

Inventor
ERWIN M. LECKBAND
By Chas. C. Reif
Attorney

Patented Sept. 11, 1934

1,973,572

UNITED STATES PATENT OFFICE 1,973,572

BOX COVER FASTENER

Erwin M. Leckband, Hutchinson, Minn.

Application October 5, 1933, Serial No. 692,304

6 Claims. (Cl. 229—47)

This invention relates to a receptacle or box and a method of fastening a cover or lid thereon, and while the invention is applicable to various boxes or receptacles, it is illustrated as applied to a box used for holding and transporting baby chicks.

In such boxes a flanged lid is used and it is desired to secure this lid to the box in a simple, inexpensive and efficient manner. It is also often desired to secure lids or covers to boxes of various kinds for handling and transportation.

It is an object of this invention to provide a simple, inexpensive and efficient method for securing a lid or cover to a box.

It is a further object to provide a structure of box and cover with a fastening means securing the box and cover including a portion which is partially severed from the cover and secured to the body portion of the box.

It is more specifically an object of this invention to provide a box structure and method of making the same, in which a flanged lid is used on the box and a tab is formed from the top of the cover being severed therefrom except along the line adjacent the wall of the box and a fastening means is then inserted through the flange, wall and tab.

These and other objects and advantages of the invention will be fully set forth in the following description made in connection with the accompanying drawing, in which like reference characters refer to similar parts throughout the several views, and in which:—

Fig. 3 is a partial view similar to Fig. 2 showing a modification.

Figure 1:
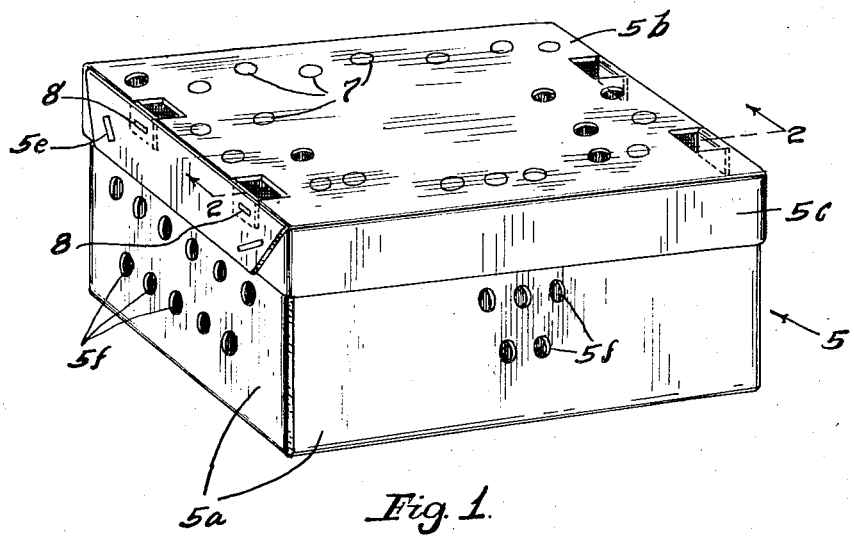
Fig. 1 is a perspective view of a box or receptacle embodying the present invention.
Figure 2:
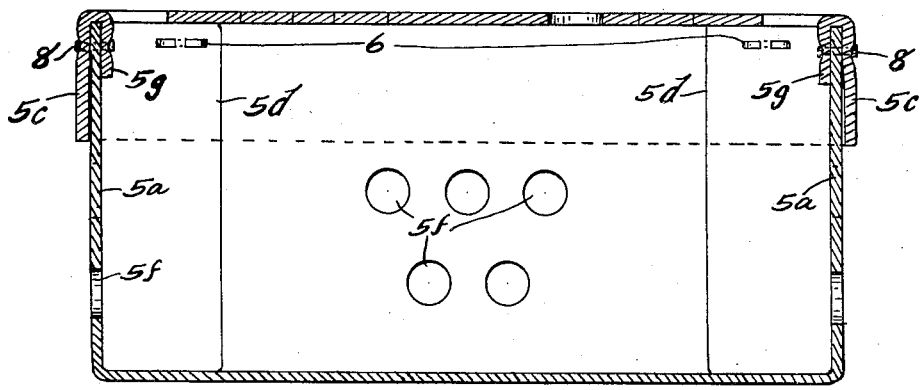
Fig. 2 is a vertical section taken on line 2—2 of Fig. 1 as indicated by the arrows.

Referring to the drawing, a receptacle or box indicated generally as 5 is shown and while this receptacle could take various forms, in the embodiment of the invention illustrated, it is shown as a box rectangular in horizontal and vertical cross section. Said box has substantially vertical side walls 5a and is provided with a lid or cover 5b, said cover having a flange 5c fitting over the body portion of said box and extending closely adjacent the outside and substantially parallel to the side walls of said box. The structure of the body portion of box 5 forms no part of the present invention but the same is illustrated as formed from a blank having portions 5d folded to extend inwardly along the inner sides of opposite side walls and be secured thereto by suitable fastening means such as the staples 6. It may be stated that lid 5b is, as shown, made from a blank, the flange portion 5c being bent at right angles and the portion thereof extending along the long side of the box also being folded to extend around the corners and being secured to the portion of the flange 5c at the shorter side of the box by staples 5e. Boxes such as illustrated which are used to contain and transport baby chicks, are usually provided with a number of severed circular portions 7, which portions 7 are allowed to remain in the box and can be pushed out to give the desired openings in the box for ventilation depending upon the temperature and other weather conditions. Box 5 is shown as having some of the portions 7 punched out or removed to form the openings 5f.

In accordance with the present invention tabs 5g are formed from the top portion of the cover and while these tabs might be of various shapes, in the embodiment of the invention illustrated, they are shown as substantially rectangular in plan. Tabs 5g are shown as severed from the top portion on three sides but being unsevered along the side disposed adjacent the side wall 5a. After being thus partially severed, tabs 5g are bent downwardly to extend vertically adjacent the inner side of the side wall 5a and substantially parallel thereto. A suitable fastening means such as the staples 8 are then inserted through the flange 5c, side wall 5a and tabs 5g, said staples, of course, being clinched preferably at the inner side of tabs 5g. The cover or lid is thus securely attached to the body portion of the box and the box can be handled and transported without any danger of the cover or lid coming off. Should it be desired to remove the lid, this can be easily done by removing staples 8. In some cases it may not be desired to have the openings in the top of the box caused by the severing of the tabs 5g. In such cases a strip of material 9 as shown in Fig. 3 can be attached extending over the top of the box and down over the ends of stables 8. Such a strip may be a gummed strip of material such as now commonly used and could be easily and quickly applied. Said openings are thus closed and staples 8 obscured.

From the above description it is seen that applicant has provided a very simple, inexpensive and efficient structure of receptacle and method of making the same. The device is quite strong and rugged so as to withstand rough usage. The same can be quickly and easily produced. The device has been amply demonstrated in actual practice and found to be very successful and efficient.

It will, of course, be understood that various changes may be made in the form, details, arrangement and proportions of the device and in the steps and sequence of steps of the method of making the same without departing from the scope of applicant's invention, which, generally stated, consists in a process and product capable of carrying out the objects above set forth, such as disclosed and defined in the appended claims.

What is claimed is:—

1. A receptacle having a body portion comprising a wall, a lid having a top portion and a portion extending adjacent said wall, said top portion having a part thereof partially severed and disposed adjacent said wall and a fastening means extending through said wall, second mentioned portion and said part and securing said lid to said body portion.

2. A box having a body portion with a substantially vertical wall and a lid having a flange disposed at the outer side of said wall, said lid having a portion partially severed therefrom and disposed along the inner side of said wall and a fastening means extending through said wall, flange and last mentioned portion.

3. A receptacle having a body portion comprising a side wall, a lid having a top portion and a flange extending along the outer side of said side wall, said top portion having a part thereof severed therefrom except along a line adjacent said wall, said part forming an opening in said lid and extending vertically downward along the inner side of said wall and fastening means extending through said wall, flange and part to secure said lid to said body portion.

4. A receptacle having a body portion comprising a wall, a lid having a top portion and a flange extending adjacent said wall, said top portion having a part thereof partially severed and disposed adjacent said wall thus leaving an opening in said top portion, a fastening means extending through said wall, flange and said part, securing said lid to said body portion and a strip of material secured to said top portion and extending over said opening to close said opening.

5. A box having a body portion including a wall, a lid having a flange disposed at the outer side of said wall, said lid having a top portion with a tab partially severed therefrom and disposed along the inner side of said wall thus forming an opening in said top portion, a fastening means extending through said wall, flange and part and a strip of material secured to said top portion extending over said opening to close the same and extending over said fastening means.

6. A box having a body portion with a substantially vertical wall, a lid having a flange disposed at the outer side of said wall, said lid having a tab partially severed therefrom and disposed along the inner side of said wall at the top thereof and a staple extending through said wall, flange and tab.

ERWIN M. LECKBAND.